May 31, 1927.
H. A. SANGREN
1,630,276
OPHTHALMIC MOUNTING
Filed Oct. 12, 1925
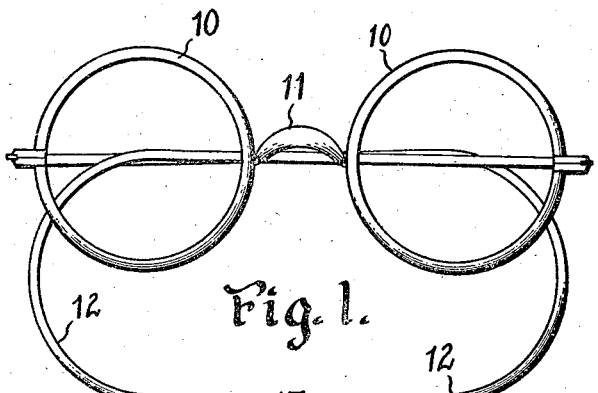
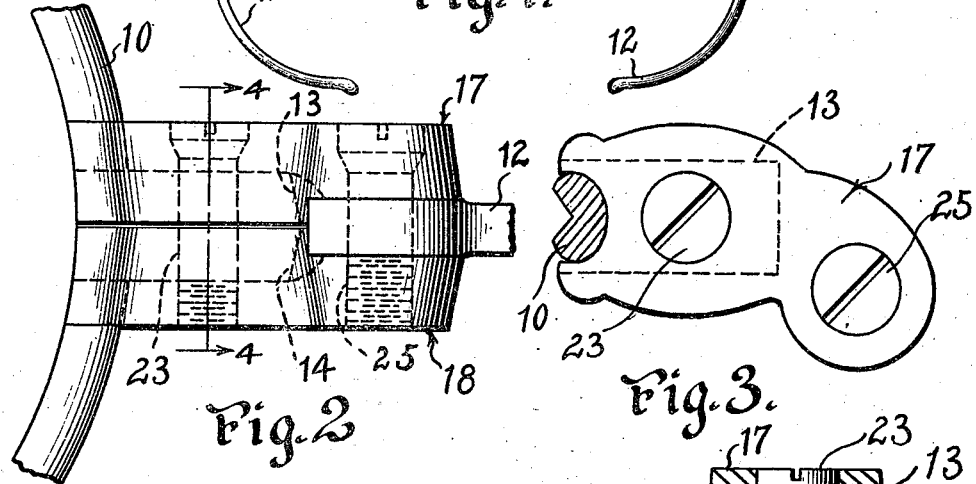
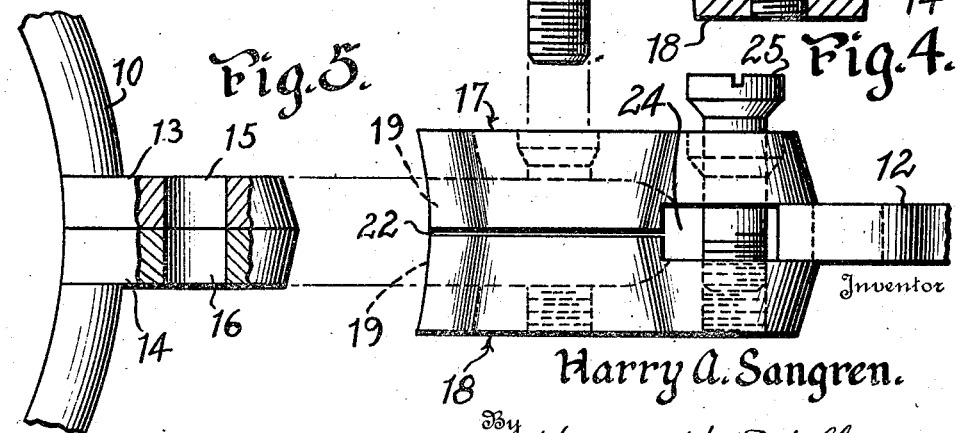
Inventor
Harry A. Sangren.
By Harry H. Styll
Attorney Patented May 31, 1927.

1,630,276

UNITED STATES PATENT OFFICE.

HARRY A. SANGREN, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

Application filed October 12, 1925. Serial No. 62,024.

This invention relates to improvements in ophthalmic mountings, and consists more particularly of a new and novel end piece or temple connection.

One of the principal objects of the present invention is to provide an improved hinge connection for securing the temples to the lens rims and for securing the lens rims together.

Another object of the invention is to provide such a construction wherein the temple may be removed without disturbing the connection of the ends of the lens rims, and vice versa.

Another object is to provide such a construction wherein the liability of the lens rims becoming out of alignment with each other will be eliminated.

Another object is to provide an end piece construction that is strong, compact and neat appearing, that will retain its alignment, and trueness of working parts during use.

Other objects and advantages of the invention will be apparent from the following specification taken in connection with the accompanying drawings, wherein is shown and described by way of illustration one particular, practical embodiment thereof, it being apparent that various modifications may be made which will fall within the scope of the invention as set forth in the appended claims, all of which modifications are considered as within the spirit of the invention and forming a part thereof.

In the drawings, forming a part of this application, and in which similar characters are used to denote corresponding parts throughout.

Figure 1 is a front elevation of a pair of spectacles constructed in accordance with the present invention;

Figure 2 is an enlarged view of the end piece and temple securing means;

Figure 3 is a top plan view thereof;

Figure 4 is a sectional view on line 4—4 of Figure 2;

Figure 5 is a view somewhat similar to Figure 2, showing the different parts prior to the assembling thereof.

Referring now to the accompanying drawings, there is shown a spectacle comprising a pair of lens rims 10 connected together by means of a suitable bridge 11 and supported on the face of the wearer by the temples 12. Each of the said lens rims is split and terminates in the separated end pieces 13 and 14, said end pieces being of substantially rectangular formation, and provided with the registering openings 15 and 16. Arranged to enclose the end pieces 13 and 14, is a housing consisting of the two parts 17 and 18, each of said parts being formed with a recess 19 to receive one of the said end pieces, the sides 20 and 21 of the parts 17 and 18, respectively, overlapping the sides of the end pieces, and being slightly spaced from each other, as at 22, in order that sufficient pressure may be applied thereto, when securing the lens rims together by means of the fastening screw 23 which passes through registering openings in the said parts and end pieces.

The adjacent faces of the parts 17 and 18 are also cut away to form a temple receiving recess 24 for the reception of the temple 12, said temple being pivotally mounted on the fastening screw 25 passing through registering openings in the said parts.

In the assembling of the invention, the two parts 17 and 18 are first placed over the end pieces 13 and 14, after which the fastening screw 23 is passed through the registering openings, whereby to secure the housing and end pieces together and the lens rim in closed position. The temple 12 is then inserted within the recess 24 and the screw 25 passed therethrough, whereby to retain the same in position.

From the above it will thus be seen that there has been provided an improved hinge connection of the type specified, which will perform all of the functions and accomplish all of the objects enumerated hereinabove, and while there has been shown and described one practical embodiment of the invention, it will be understood that various modifications thereof may be made without departing from or exceeding the spirit of the invention, so long as such modifications fall within the scope of the appended claims.

What is claimed is:

1. An ophthalmic mounting comprising a split frame having offset end pieces with aligned openings therethrough, a pair of separated members having recesses to fit over the respective end pieces, openings to align with the openings in the end pieces, recesses to receive the end of a temple and openings communicating with the temple recesses, holding means through the end piece openings to hold the separated members and the end pieces together, and holding means through the openings communicating with the temple recesses to pivotally hold the temple in the temple recesses.

2. An ophthalmic mounting comprising a split frame having offset end pieces with aligned openings therethrough, a pair of separated members having recesses to fit over the respective end pieces, recesses to fit around the respective rim portions, openings to align with the openings in the end pieces, recesses to receive the end of a temple and openings communicating with the temple recesses, holding means through the end piece openings to hold the separated members and the end pieces together, and holding means through the openings communicating with the temple recesses to pivotally hold the temple in the temple recesses.

HARRY A. SANGREN.